United States Patent
Pischl et al.

(10) Patent No.: US 8,903,009 B2
(45) Date of Patent: Dec. 2, 2014

(54) COMMON-MODE TERMINATION WITHIN COMMUNICATION SYSTEMS

(71) Applicant: Broadcom Corporation, Irvine, CA (US)

(72) Inventors: Neven Pischl, Santa Clara, CA (US); Ahmad Chini, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 65 days.

(21) Appl. No.: 13/673,126

(22) Filed: Nov. 9, 2012

(65) Prior Publication Data

US 2013/0177099 A1 Jul. 11, 2013

Related U.S. Application Data

(60) Provisional application No. 61/583,774, filed on Jan. 6, 2012.

(51) Int. Cl.
*H04B 15/00* (2006.01)
*H04L 25/02* (2006.01)

(52) U.S. Cl.
CPC ............ *H04B 15/00* (2013.01); *H04L 25/0276* (2013.01); *H04L 25/0294* (2013.01); *H04L 25/0282* (2013.01)
USPC ........... 375/285; 375/257; 375/258; 375/286; 375/295; 375/316

(58) Field of Classification Search
CPC ............ H04L 27/0002; H04L 27/2601; H04L 25/0294; H04L 25/0298; H04L 12/66; H04L 25/0276; H04L 25/0282; H04L 2012/40273; H04L 25/0266; H04L 25/08; H04L 5/1461; H04L 12/40; H04L 12/44; H04M 11/062; H04M 1/7385; H04M 1/585; G08C 15/08; H01R 12/725; H01R 13/6461; H01R 13/6471; H01R 13/6477; H01R 23/688; H01R 23/7073
USPC ......... 375/256, 257, 258, 259, 271, 278, 284, 375/285, 288, 295, 316, 352, 353, 377
See application file for complete search history.

(56) References Cited

U.S. PATENT DOCUMENTS

| | | | |
|---|---|---|---|
| 6,486,746 B1 * | 11/2002 | Gilbert | 333/22 R |
| 7,956,701 B2 * | 6/2011 | Hemmerlein et al. | 333/24 C |
| 8,125,240 B2 * | 2/2012 | Broyde et al. | 326/21 |
| 8,164,358 B2 * | 4/2012 | Van Den Brande et al. | 326/30 |
| 8,284,007 B1 * | 10/2012 | Langner et al. | 336/145 |
| 2005/0219006 A1 * | 10/2005 | Suenaga et al. | 333/12 |

(Continued)

*Primary Examiner* — Hirdepal Singh
(74) *Attorney, Agent, or Firm* — Garlick & Markison; Shayne X. Short

(57) ABSTRACT

Common-mode termination within communication systems. Termination is implemented with respect to two respective portions of a system: the intentional signaling within a communication system as well as any unintentional signaling which may be coupled into the system. Such unintentional signaling may be incurred in a variety of ways including via interference which may be generated by the system itself or by other devices or components external to the system. In addition, such unintentional signaling made be characterized as common-mode (CM) signaling, in that, it generally affects different respective portions of the system similarly or in the same manner. Various communication systems may include two or more devices implemented therein, that effectuate signaling via one or more communication links there between. Appropriate termination is made with respect to both the intentional and unintentional signaling portion of the system using any of a variety of impedance types (e.g., resistors, capacitors, inductors, etc.).

20 Claims, 11 Drawing Sheets

(56) References Cited

U.S. PATENT DOCUMENTS

| | | | |
|---|---|---|---|
| 2008/0012658 A1* | 1/2008 | Fortier | 333/12 |
| 2009/0027937 A1* | 1/2009 | Kirchmeier et al. | 363/133 |
| 2009/0067614 A1* | 3/2009 | Washburn et al. | 379/398 |
| 2010/0214036 A1* | 8/2010 | Seberger | 333/32 |
| 2011/0268258 A1* | 11/2011 | Alloin et al. | 379/32.04 |
| 2012/0086525 A1* | 4/2012 | Dove | 333/22 R |

* cited by examiner

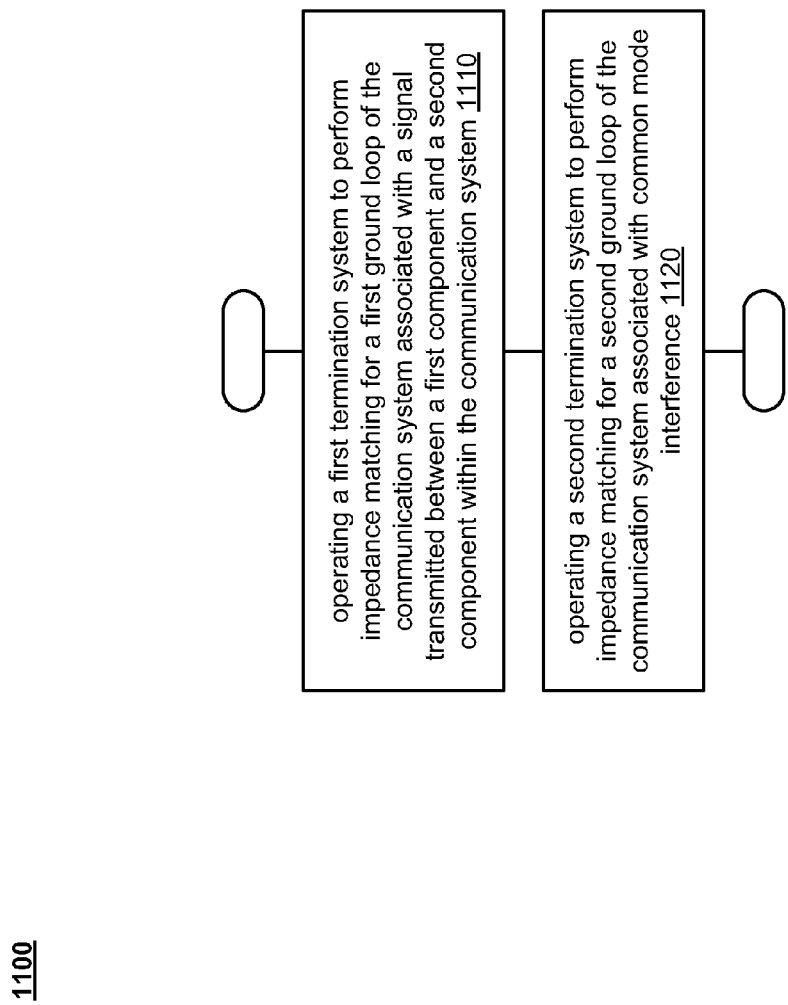

US 8,903,009 B2

COMMON-MODE TERMINATION WITHIN COMMUNICATION SYSTEMS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/583, 774, entitled "Common mode Termination for communications cables," filed Jan. 6, 2012, pending.

BACKGROUND OF THE INVENTION

1. Technical Field of the Invention

The invention relates generally to communication systems; and, more particularly, it relates to compensating for, reducing, or eliminating undesirable interference that may be incurred within such a communication systems.

2. Description of Related Art

Data communication systems have been under continual development for many years. Generally speaking, a communication system may include two or more respective devices coupled or connected via one or more communication links. In some instances, undesirable interference may itself be generated by various components within such a communication system or be absorbed by those various components within such a communication system. The present state-of-the-art does not provide an adequate means to compensate for all of the types of interference that may occur within such communication systems that may be absorbed by one or more various components within such communication systems.

BRIEF DESCRIPTION OF THE SEVERAL VIEWS OF THE DRAWINGS

FIG. 11 illustrates an embodiment of a method for operating one or more communication devices.

DETAILED DESCRIPTION OF THE INVENTION

Figure 1:
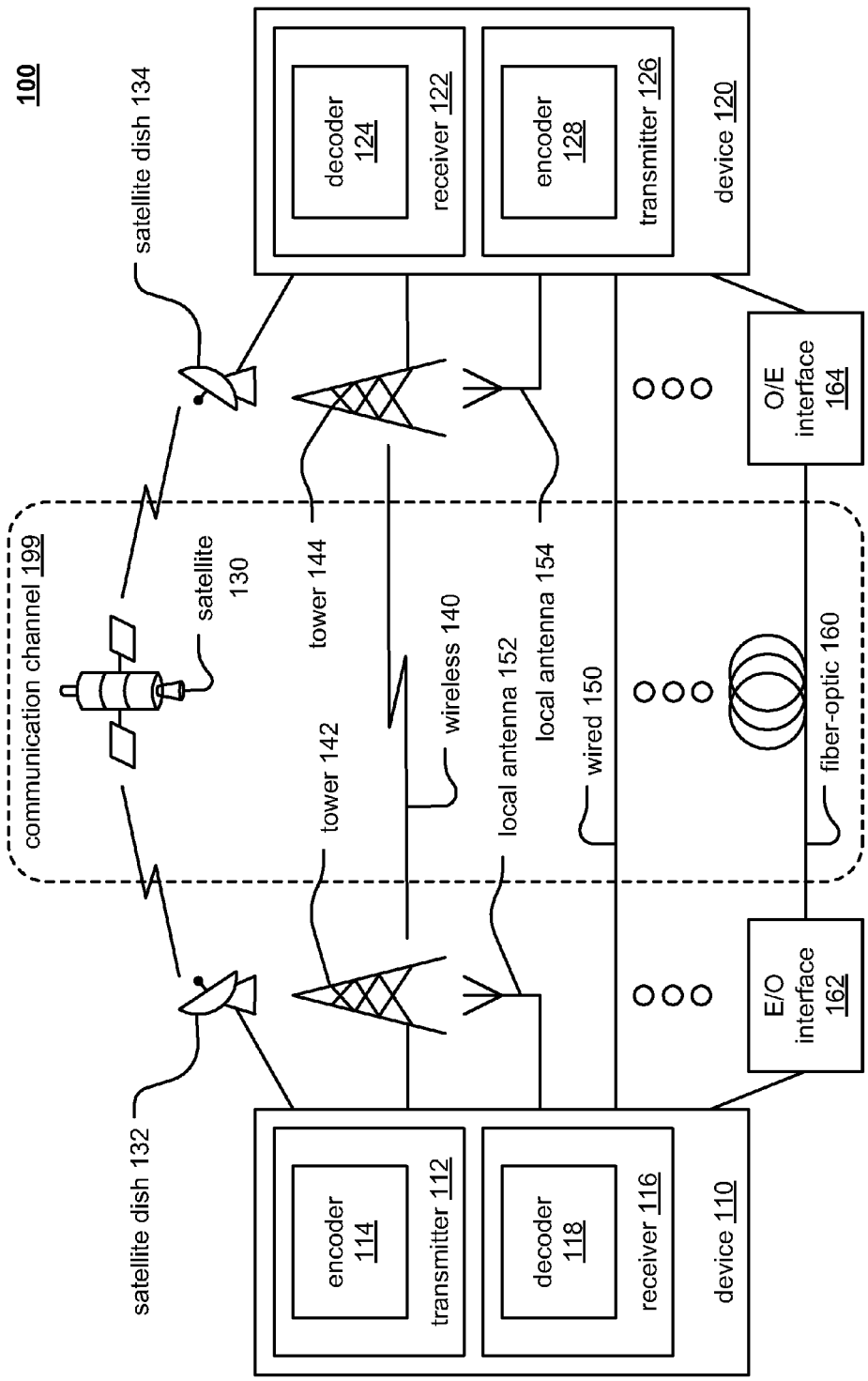
FIG. 1 and FIG. 2 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
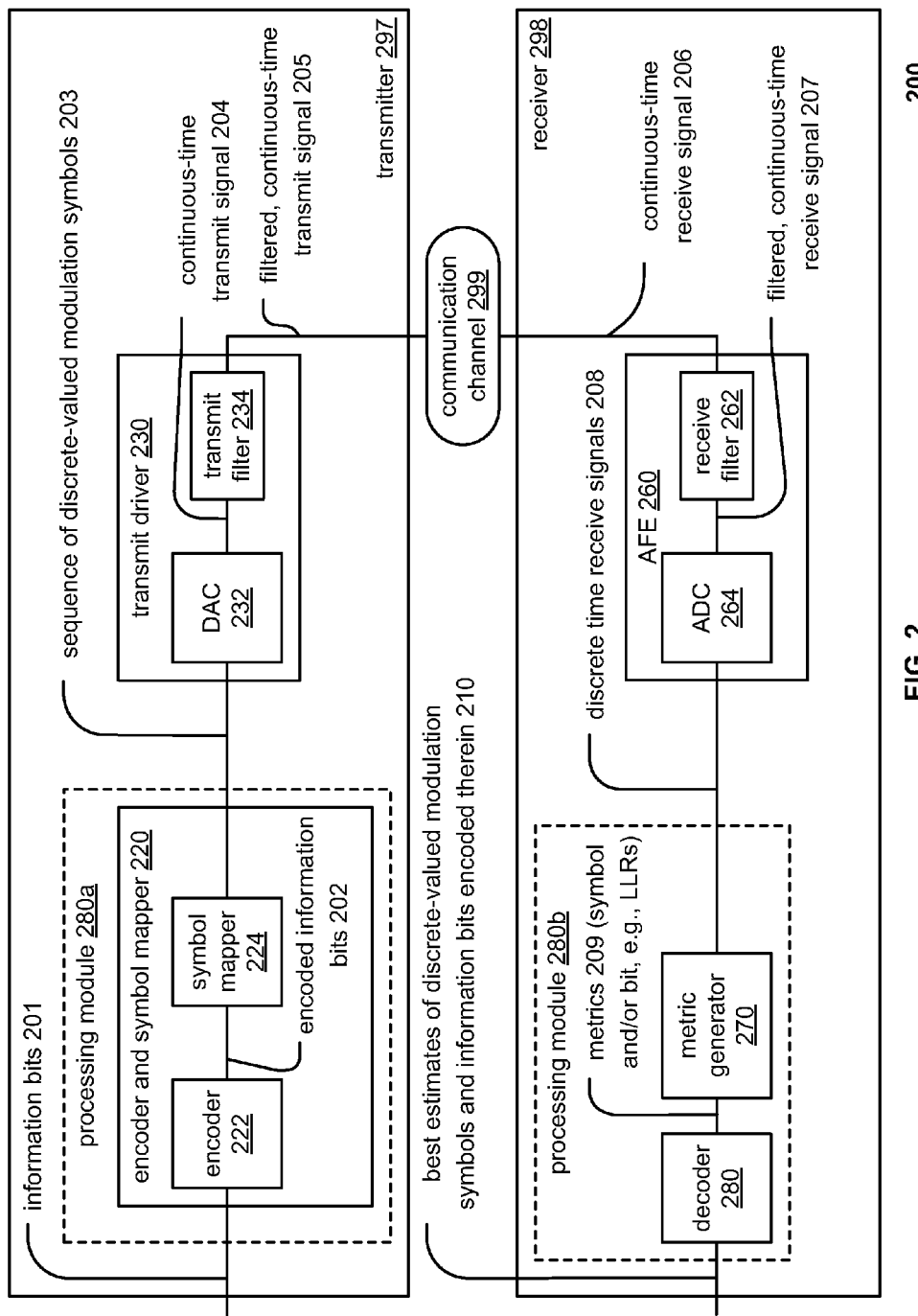

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280*a* as including the encoder and symbol mapper 220 and all associated, corresponding components therein, and a processing module 280*b* is shown as including the metric generator 270 and the decoder 280 and all associated, corresponding components therein. Such processing modules 280*a* and 280*b* may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299). It is noted that any respective communications herein between different respective devices may be effectuated using any communication link, network, media, means, etc. including those described with reference to FIG. 1 and their equivalents.

As may be understood, communication systems can be implemented using any of a number of types of media to effect any of a number of types of communication links (e.g., including single-ended, differential, shielded coaxial, among others, etc.)

that couple or connect two or more communication devices. In the context of communication systems including at least one communication pathway implemented using wire based media (and which may include any one or more other types of communication links effectuated using any desired types of communication media), such a communication system can include at least two (or more) devices coupled or connected with at least one cable.

One example may include an Ethernet link, such as formed with two Ethernet operative or capable devices and a cable (e.g., a twisted-pair cable) between them. The devices may be implemented in a variety of ways including in either a shielded or an unshielded enclosure. The cable connecting such devices may also be either shielded or unshielded cable (e.g., unshielded twisted pair (UTP) or shielded twisted pair (STP)). Other examples of media by which the cable be implemented include a coaxial cable, shielded or unshielded star-quad cable, among other types of cables.

In some embodiments, these devices are connected to ground (e.g., a safety protective ground, Earth ground, etc.). Such connection may be made using a metal wire in a power cord energizing or providing power at least one component in the device or via some other metal connection means. Alternatively, it may not be connected to any such ground at all (e.g., it may be left "floating").

The electromagnetic compatibility (EMC) performance (e.g., such as in accordance with any of a number of EMC standards, recommended practices, protocols, etc. such as may be defined or provided via any number of regulatory and standard bodies), such as the emission and immunity properties of these devices, is strongly influenced by the manner of shielding, cable type, and connection of the devices to ground, or a lack of shields and/or such connections.

One of the key properties affected by these parameters corresponds to resonances of the connection formed by these two interconnected devices. These resonances, and EMC characteristics, are especially related to the unintended propagation of common-mode (CM) currents and voltages on the cable, which is propagation of the "noise" over the entire cable as opposed to propagation of the intentional signals between wires of the cable.

Figure 3:
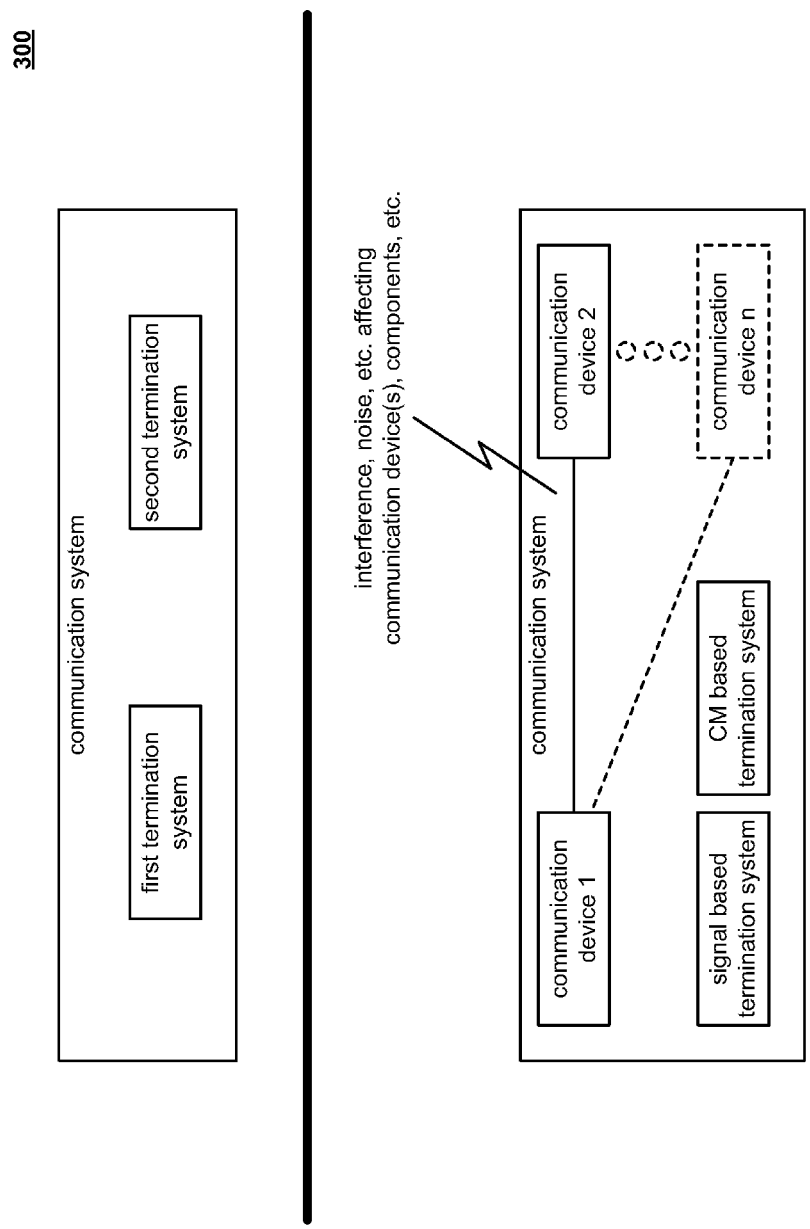
FIG. 3 illustrates various embodiments of communication systems including two separate termination systems (e.g., one for signal based termination and another for common mode based termination).

FIG. 3 illustrates various embodiments 300 of communication systems including two separate termination systems (e.g., one for signal based termination and another for common-mode (CM) based termination). Generally speaking, various aspects, embodiments, and/or their equivalents, of the invention may be viewed as including at least two respective termination systems within a communication system. That is to say, one termination system may be implemented to compensate for, reduce, or eliminate deleterious effects associated with one part of a communication system, and another termination system may be implemented to compensate for, reduce, or eliminate deleterious effects associated with another part of a communication system (e.g., as pictorially depicted at the top of the diagram).

Partitioning these two respective parts of a communication system may occur along the lines of intentional signaling according within the communication system and unintentional signaling, which may, unfortunately, occur within the communication system. Such unintentional signaling may be viewed as being associated with interference which may be introduced within the system in a common-mode (CM) manner.

For example, with respect to CM signals that may be coupled to a cable within a communication system, at least one of the termination systems within the communication system is operative to absorb or dissipate such CM signals using any of a various number of combinations of resistors, capacitors, inductors, etc. and/or generally any combination of impedance elements (e.g., which may be implemented using passive elements in a preferred embodiment but may alternatively include one or more active elements without departing from the scope and spirit of the invention). Generally speaking, such CM signals may be characterized as being absorbed coupled into more than one element within the communication system similarly. For example, CM interference may similarly affect both respective signal lines of a differential cable, the signal conductor as well as shielded cabling around a shielded cable, etc.

Referring to the bottom portion of the diagram, a communication system may be viewed as two or more communication devices that operate to communicate signals there between. In some instances, interference, noise, etc. may affect one or more devices, components, etc. within the communication system. Two different respective termination systems may be implemented within the communication system; a signal based termination system, and a common-mode (CM) based termination system. From certain perspectives, a signal based termination system may be operative to ensure effective transmission of signaling within such a communication system (e.g., to reduce or minimize reflections, ensure maximum power transfer, etc.). Also, from certain perspectives, the CM based termination system may be viewed as compensating for, reducing, or eliminating any CM signaling that may be coupled into the system resulting in any of a number of deleterious effects (e.g., distortion, reduced signal-to-noise ratio, loss of signaling, etc.).

Figure 4:
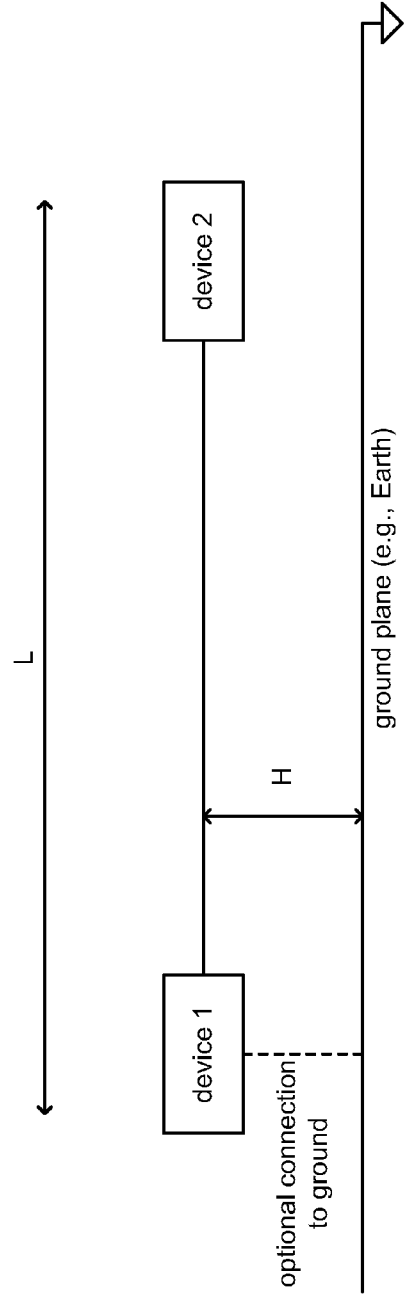
FIG. 4 illustrates an embodiment of two devices, connected by a cable, over a ground plane.

FIG. 4 illustrates an embodiment 400 of two devices, connected by a cable, over a ground plane. In this diagram, two respective devices are depicted as two respective units, connected by a cable, and over a ground plane.

The entire link in this diagram can be approximated for common-mode (CM) with a piece of wire of a similar length above a ground (GND) plane, perhaps with some added capacitance to ground at each end. That capacitance is formed between the body of each device and the ground plane, and depends on the device size and distance from the ground plane.

EMC characteristics of such a link are greatly dependent on common-mode (CM) propagation between the two devices. In the case of emission, common-mode (CM) currents and voltages on the cable, which may be generated by the devices, can propagate on the cable and cause radiation from the cable, which can cause electromagnetic interferences (EMI). In the case of immunity, common-mode (CM) currents and voltages on the cable are induced on the cable by the cable picking up electromagnetic fields generated by an external noise source (e.g., a radiating antenna or other interfering device). Common-mode (CM) currents and voltages then propagate on the cable between the two devices and can cause EMI. In that sense, the emission and immunity mechanisms are similar and reciprocal to one another.

Such a cable suspended over a ground plane may be viewed as forming a transmission line that has characteristic impedance for common-mode (CM) propagation Z0cm, which is roughly determined by the per-unit-length inductance, Li, and capacitance, Ci, of the entire cable relative to the ground plane, and may be described as follows:

$$Z0cm = \text{sqrt}(Li/Ci).$$

These parameters above depend largely on the height (distance) of the cable from the ground plane (H) as well as the dielectric material (e.g., insulator material) of the cable. From both simulation and practical measurements, it has been determined that the typical Z0cm is in the range of several hundred Ohms (Ω) (e.g., 150Ω-500Ω) for typical installations and EMC test conditions. In special cases, Z0cm value can be considerably different.

From the electromagnetics, it is well known that any such system as shown in this diagram, and which can be well represented by a wire over ground plane, may exhibit resonances. The resonant frequencies depend in the first place on the size (length) of the entire link relative to the wavelength. For a "floating" system, the first resonance frequency has half wavelength (λ/2) that equals the length of the cable L, and may be described as follows:

$$L = \lambda/2$$

In case when the ends of the cable are grounded, e.g., through grounding each device to the ground plane, the first resonance is at the frequency when the circumference of the loop is half wavelength, and may be described as follows:

$$2(L+H) = \lambda/2$$

There are also successive resonances at every multiple of the resonant frequency.

In some cases, even when there is e.g. a power cable between the devices and the ground plane, and the cable provides a safety direct current (DC) connection to the ground plane, there may be often high-impedance common-mode choke used at the location where the power cable is connected to the device, therefore rendering the device effectively disconnected from the ground plane at the frequencies where the impedance of the common-mode choke is high, e.g., in the kΩ range or more in the frequency spectrum of the communications-interface signal, e.g. tens of MHz or higher.

In accordance with such resonances which may be created within such a system, different respective and distinct resonances with relatively very high amplitudes relative to the regions between those resonances may occur. Such resonant peaking can occur and be measured with respect to end devices disconnected from the ground plane.

At least one problem associated with such excess emission or poor immunity often arises at the frequencies of the resonant peaking. The resonant peaking increases the emission from the cable and the devices, and also increases coupling of the externally-generated noise thereby decreases the immunity of devices to such noise. The consequence in any case is decreased immunity performance, higher levels of generated electromagnetic interference (EMI), and non-compliance with various electromagnetic compatibility EMC standards, recommended practices, protocols, etc. such as may be defined or provided via any number of regulatory and standard bodies.

In typical applications, as mentioned elsewhere herein, the ends of the line are either left open or shorted to ground. Referring again to FIG. 4, it can be seen that the transmission line is not terminated in either of these cases. A properly terminated transmission line has an impedance or resistor to ground, with the impedance or resistor value equal to the characteristic impedance of the transmission line. Such a terminated transmission line does not show resonant peaking, and its respective frequency response is relatively flat across the frequencies (e.g., when compared to the resonant peaking that can undesirably occur without the implementation of such impedance).

Figure 5:
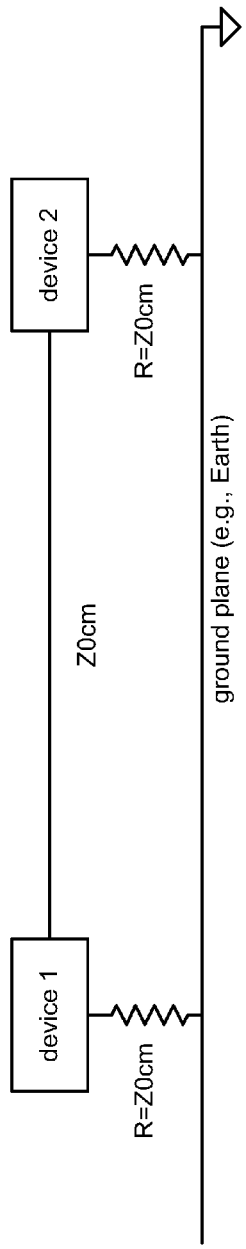
FIG. 5 and FIG. 6 illustrate alternative embodiments of two devices, connected by a cable, over a ground plane.
Figure 6:
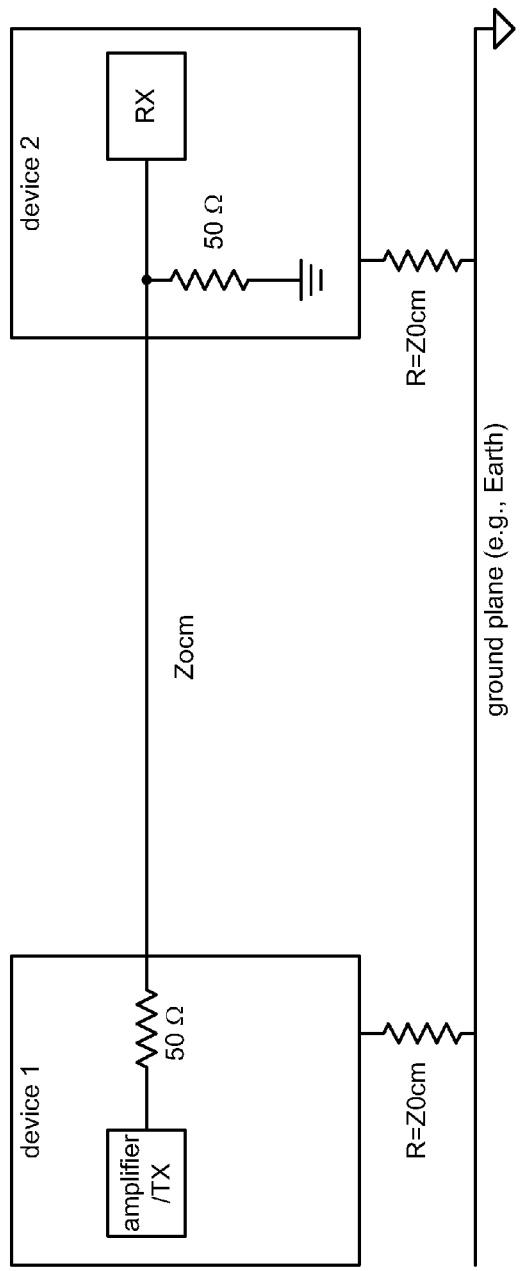

In case when multiple resistors are used, for terminating more than a single line, the combined value of the resistance must be in the appropriate range (e.g., 150Ω to 500Ω). For example, the line in FIG. 4 can be terminated with a resistor from each device to ground, as shown in FIG. 5 or FIG. 6.

The effect of such termination resistors to compensate for, reduce, or eliminate the resonant peaking can be effectuated using resistors from device to the ground plane. The use of such termination impedances or resistors can operate to compensate for, reduce, or eliminate undesirable resonant peaking, which can provide for considerably better EMC performance compared with either the "floating" or "grounded" cases from FIG. 4.

Several of the diagrams included herein show various aspects, embodiments, and/or their equivalents, of the invention to effectuate common-mode (CM) termination. Various other examples can be constructed, depending on the factors such as type of cable, enclosure, manner of signaling, etc.

In order to ensure that the intended resistors provide the correct impedance, it may be necessary to use high-impedance inductors, common-mode chokes, and/or ferrite beads, effectively to isolate the terminating resistance from the rest of the system impedance. Otherwise, the other impedances may come in parallel or series with the terminating resistors, and defy the purpose of the added common-mode terminating resistors. In certain embodiments, only one side of a communication link is shown.

FIG. 5 and FIG. 6 illustrate alternative embodiments 500 and 600, respectively, of two devices, connected by a cable, over a ground plane.

Referring to embodiment 500 of FIG. 5, as may be seen, two respective resistors having the characteristic impedance of the common-mode (CM) propagation Z0cm may be implemented between the respective devices at ends of the communication link and the ground plane. While resistors are particularly shown within this embodiment 500, it is noted that any desired combination of different respective components may be employed to effectuate the terminating impedances implemented between the respective devices in the ground plane. For example, if desired in instances in which the common-mode (CM) propagation Z0cm may have a non-real component, alternative embodiments may include some combination of components to ensure impedance matching to the common-mode (CM) propagation Z0 cm without departing from the scope and spirit of the invention.

Referring to embodiment 600 of FIG. 6, similar to the prior diagram, this diagram analogously has two respective resistors having the characteristic impedance of the common-mode (CM) propagation Z0cm may be implemented between the respective devices at ends of the communication link and the ground plane. However, this diagram also includes two respective 50 Ohm (Ω) resistors implemented to effectuate termination of the intentional based signaling to be transmitted from the first device to the second device. For example, considering that the first device may include an amplifier/transmitter, and the second device may include a receiver, then two respective 50 Ohm (Ω) resistors are implemented, as pictorially show, to effectuate appropriate termination of signaling that may be transmitted from the amplifier/transmitter of the first device to the receiver of the second device.

As may be understood, two respective termination systems are implemented with respect to this embodiment 600, such that one of the termination systems corresponds to intentional signaling to be transmitted between the respective devices, and another of the termination systems corresponds to an intentional signaling that may be coupled into the system (e.g., CM related signaling).

Figure 7:
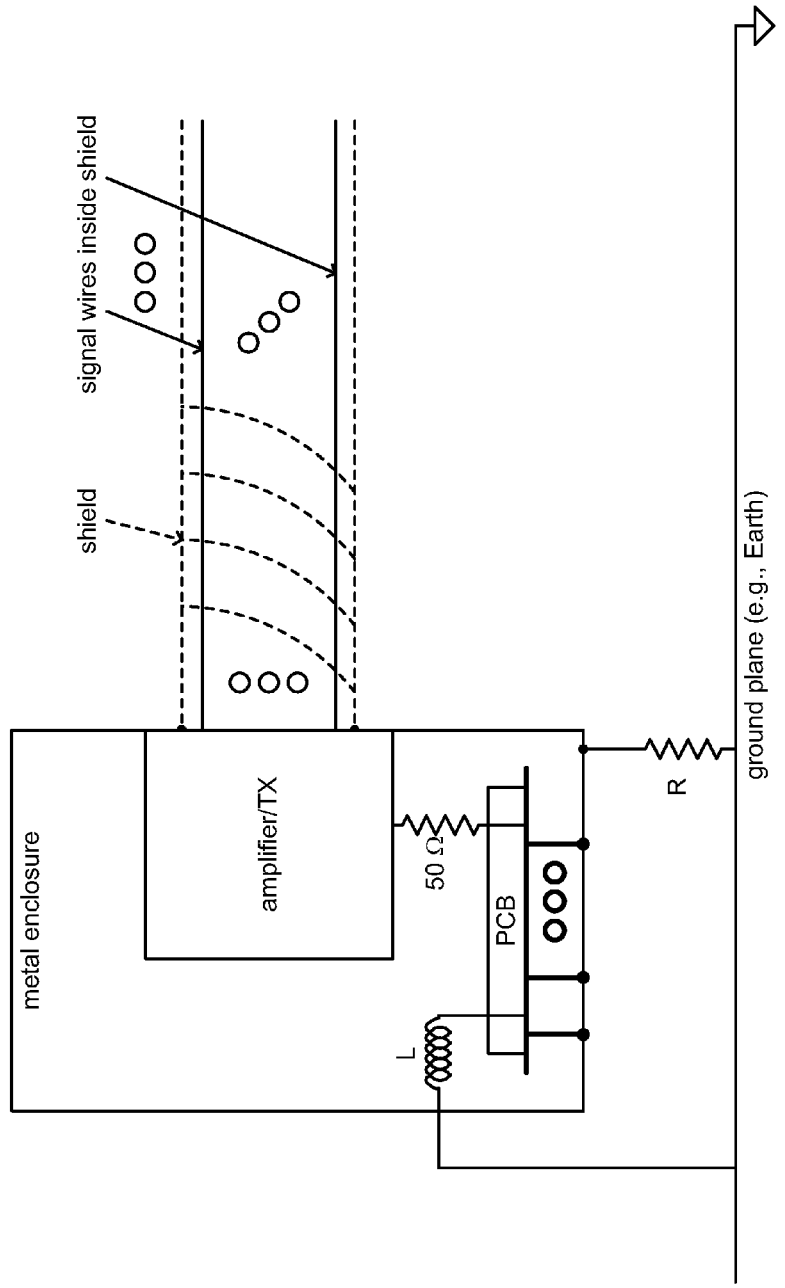
FIG. 7 illustrates an embodiment of a metal enclosed device, coupled or connected to a shielded cable and with a printed circuit board (PCB) ground coupled or connected to metal enclosure/shield.

FIG. 7 illustrates an embodiment 700 of a metal enclosed device, coupled or connected to a shielded cable and with a printed circuit board (PCB) ground coupled or connected to metal enclosure/shield. As also stated elsewhere herein, it is noted that various embodiments may detect only one respective device that one particular end of a communication link. For example, this diagram illustrates a device at one end of a communication link having a metal enclosure. Within the device, an amplifier/transmitter is implemented to effectuate signaling via one or more signal wires inside of a shielded cable. The device also includes a printed circuit board (PCB) that may include any of a number of respective devices implemented thereon. A 50 Ohm (Ω) resistor is shown as being coupled or connected between the amplifier/transmitter and the ground plane of the PCB. It is noted that the ground plane of the PCP is also coupled are connected to the metal enclosure itself. In addition, a terminating resistance is coupled or connected between the metal enclosure and the ground plane (e.g., Earth or Earth ground).

As may be seen with respect to this diagram, it can be seen that the 50 Ohm (Ω) resistor may be viewed as being implemented in accordance with one of the termination systems that corresponds to intentional signaling to be transmitted between the respective devices, and the resistor, R, coupled or connected between the metal enclosure and the ground plane may be viewed as being implemented in accordance with another of the termination systems corresponds to an intentional signaling that may be coupled into the system (e.g., CM related signaling).

Within this diagram as well as within certain other diagrams and/or embodiments, a high-impedance common-mode choke (pictorially illustrated as L) may be employed at the location where the power cable is connected to the device, therefore rendering the device effectively disconnected from the ground plane at the frequencies where the impedance of the common-mode choke is high, e.g., in the kΩ range or more in the frequency spectrum of the communications-interface signal, e.g. tens of MHz or higher.

Figure 8:
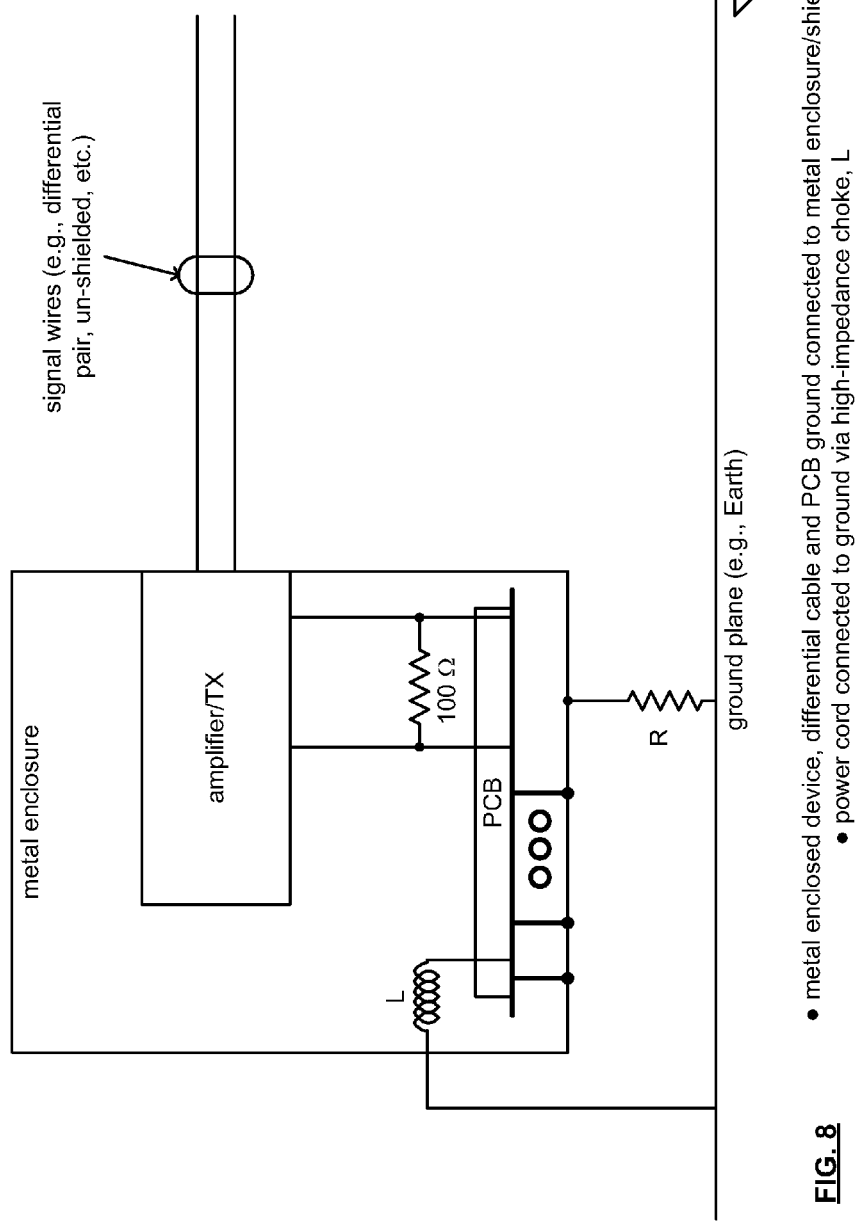
FIG. 8 illustrates an embodiment of a metal enclosed device, coupled or connected to a differential cable and with a PCB ground coupled or connected to metal enclosure/shield.

FIG. 8 illustrates an embodiment 800 of a metal enclosed device, coupled or connected to a differential cable and with a PCB ground coupled or connected to metal enclosure/shield. This diagram has many similarities to the previous diagram, with at least one difference being that a different type of signal wires are employed to effectuate communications to and/or from the device. For example, such signal wires in this diagram may be implemented as a differential pair, unshielded, etc.

In comparison to the previous diagram, a 100 Ohm (Ω) resistor is instead coupled or connected between two respective signal connections implemented between the amplifier/transmitter of the device and the ground plane of the PCB. Again, a high-impedance common-mode choke (pictorially illustrated as L) may be employed at the location where the power cable is connected to the device, analogous to the prior diagram.

It is also noted within this diagram as well as other diagrams that may include a metal enclosure of the device, it is also noted that other materials may be employed to enclose a device without departing from the scope and spirit of the invention (e.g., a plastic enclosure, a combination of metal and plastic materials, other dielectric materials, etc.).

Figure 9:
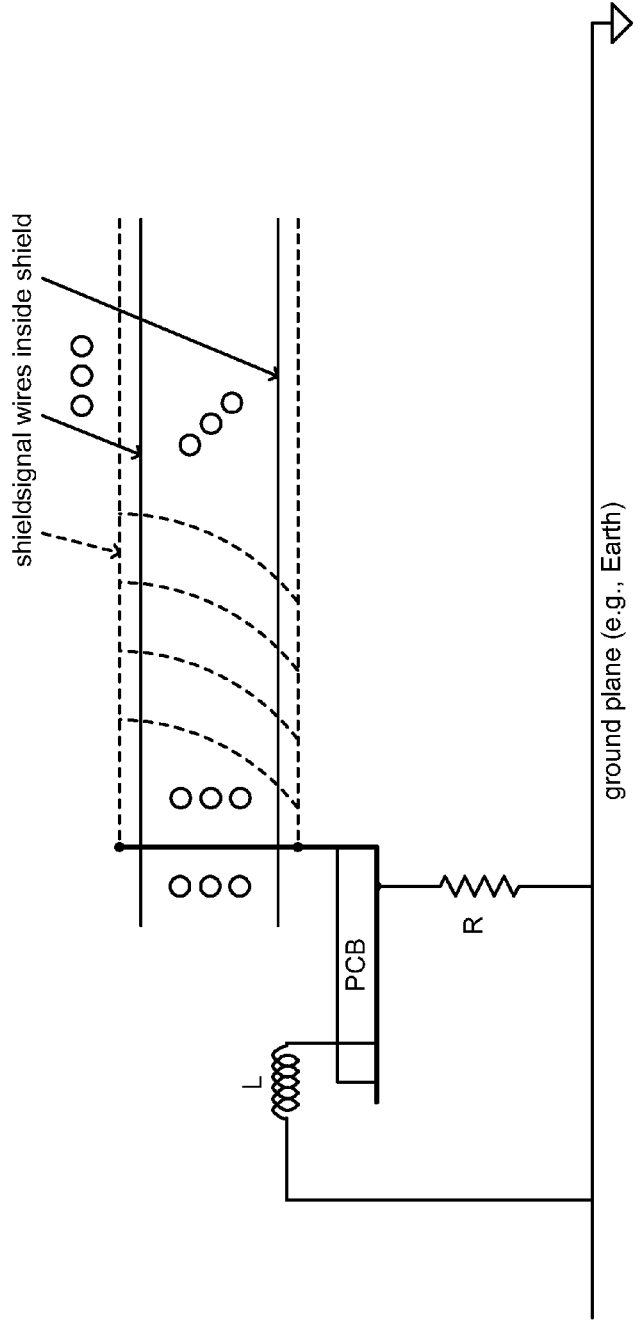
FIG. 9 illustrates an embodiment of a device having no metal or plastic enclosure, coupled or connected to a shielded cable whose shield is coupled or connected with a PCB ground.

FIG. 9 illustrates an embodiment 900 of a device having no metal or plastic enclosure, coupled or connected to a shielded cable whose shield is coupled or connected with a PCB ground. In comparing this diagram to prior other diagrams, the device this diagram includes no metal or plastic enclosure. In this diagram, an impedance is coupled or connected between a ground plane of a PCB of the device and the ground plane. Within this diagram, the device is implemented to effectuate signaling via one or more signal wires inside of a shielded cable.

Again, a high-impedance common-mode choke (pictorially illustrated as L) may be employed at the location where the power cable is connected to the device, analogous to the prior diagram.

Figure 10:
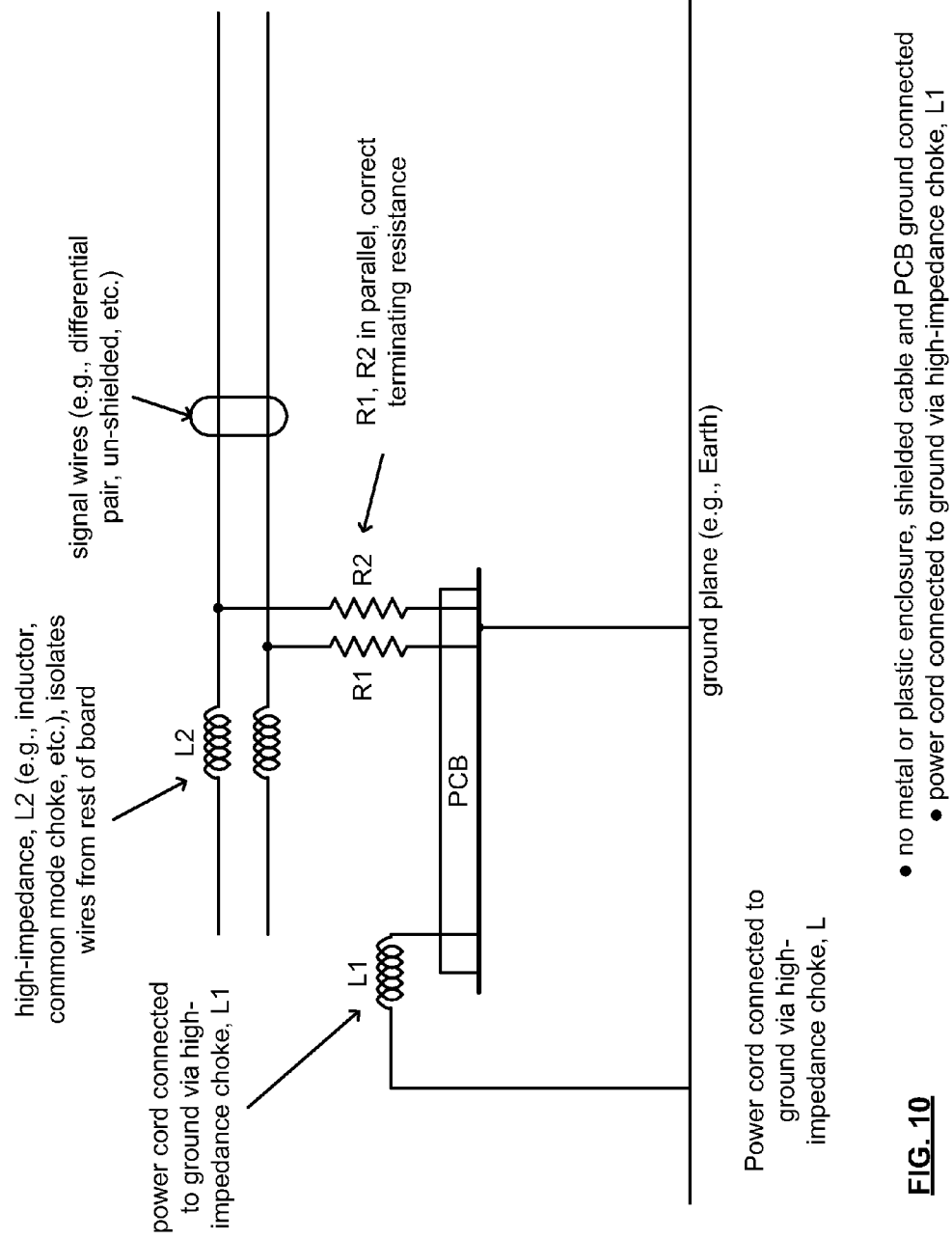
FIG. 10 illustrates an alternative embodiment of a device having no metal or plastic enclosure, coupled or connected to a shielded cable whose shield is coupled or connected with a PCB ground.

FIG. 10 illustrates an alternative embodiment 1000 of a device having no metal or plastic enclosure, coupled or connected to a shielded cable whose shield is coupled or connected with a PCB ground. Again, in comparing this diagram to other and prior other diagrams, the device of this diagram includes no metal or plastic enclosure. In this diagram, no impedance coupled between a ground plane of the PCB of the device and the ground plane. This diagram shows a different type of signal wiring (e.g., differential cable, un-shielded, etc.) is employed to effectuate signaling in comparison to the prior diagram. In this diagram, two respective impedances are shown as being implemented in parallel and connected to the two respective signal wires coming to the device.

Within this diagram as well as within certain other diagrams and/or embodiments, a high-impedance common-mode choke (pictorially illustrated as L1) may be employed at the location where the power cable is connected to the device, therefore rendering the device effectively disconnected from the ground plane at the frequencies where the impedance of the common-mode choke is high, e.g., in the kΩ range or more in the frequency spectrum of the communications-interface signal, e.g. tens of MHz or higher.

In this diagram as well, another high-impedance common-mode choke may be employed (e.g., pictorially illustrated as L2, which may be implemented as two respective high-impedance common-mode chokes implemented in parallel with respect to each other, such that each respective each high-impedance common-mode choke is implemented in line with the respective signal wires depicted). The use of such additional high-impedance common-mode choke (L2) may be viewed as isolating the signal wires from the rest of the board or PCB.

In addition, various aspects, embodiments, and/or their equivalents, of the invention may be implemented within any of a number of other different types of systems without departing from the scope and spirit of the invention. For example, generally speaking, various devices may operate to include two respective termination systems, such that one of the termination systems corresponds to the intentional signaling within the system, and another of the termination systems corresponds to the unintentional signaling which may be coupled into the system. From certain perspectives, these two respective termination systems operate cooperatively or synergistically to ensure effective overall operation of the system.

FIG. 11 illustrates an embodiment of a method 1100 for operating one or more communication devices.

The method 1100 begins by operating a first termination system to perform impedance matching for a first ground loop of the communication system associated with a signal transmitted between a first component and a second component within the communication system, as shown in a block 1110.

The method 1100 continues by operating a second termination system to perform impedance matching for a second ground loop of the communication system associated with common-mode (CM) interference, as shown in a block 1120.

It is also noted that the various operations and functions as described with respect to various methods herein may be performed within a variety of types of communication devices, such as using one or more processors, processing modules, etc. implemented therein, and/or other components therein including one of more baseband processing modules, one or more media access control (MAC) layers, one or more physical layers (PHYs), and/or other components, etc.

In some embodiments, such a processor, circuitry, and/or a processing module, etc. (which may be implemented in the same device or separate devices) can perform such processing to generate signals for communication with other communication devices in accordance with various aspects of the invention, and/or any other operations and functions as described herein, etc. or their respective equivalents. In some embodiments, such processing is performed cooperatively by a first processor, circuitry, and/or a processing module, etc. in a first device, and a second processor, circuitry, and/or a processing module, etc. within a second device. In other embodiments, such processing is performed wholly by a processor, circuitry, and/or a processing module, etc. within a singular communication device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
a first termination system configured to perform impedance matching for a first ground loop of a communication system associated with a signal transmitted between a first component and a second component within the communication system, wherein the communication system includes a single-ended communication link or a differential communication link between the first component and the second component, and wherein the first ground loop corresponds to a component-based ground within at least one of the first component or the second component; and
a second termination system configured to:
perform impedance matching for a second ground loop of the communication system associated with common-mode interference, wherein the second ground loop corresponds to a non-component-based ground or an Earth-based ground, wherein the common-mode interference is coupled into the single-ended communication link or the differential communication link; and
absorb or dissipate the common-mode interference.

2. The apparatus of claim 1, wherein:
at least one of the first component or the second component includes a printed circuit board (PCB); and
the component-based ground within the at least one of the first component or the second component corresponds to a PCB-based ground within the at least one of the first component or the second component.

3. The apparatus of claim 1, wherein:
the first component is a first shielded or unshielded enclosed communication device; and
the second component is a second shielded or unshielded enclosed communication device.

4. The apparatus of claim 1, wherein:
the communication system includes the single-ended communication link between the first component and the second component;
the first termination system includes a first impedance implemented in-line between the first component and a first end of the single-ended communication link and a second impedance implemented between a second end of the single-ended communication link and a component-based ground within the second component; and
the second termination system includes a third impedance implemented between the first component and a non-component-based ground or an Earth-based ground and a fourth impedance implemented between the second component and the non-component-based ground or the Earth-based ground.

5. The apparatus of claim 1, wherein the communication system is at least one of a satellite communication system, a wireless communication system, a wired communication system, a fiber-optic communication system, or a mobile communication system.

6. An apparatus comprising:
a first termination system configured to perform impedance matching for a first ground loop of a communication system associated with a signal transmitted between a first component and a second component within the communication system that includes a single-ended communication link between the first component and the second component, wherein the first termination system includes first impedance implemented in-line between the first component and first end of the single-ended communication link and second impedance implemented between second end of the single-ended communication link and a component-based ground within the second component; and
a second termination system configured to perform impedance matching for a second ground loop of the communication system associated with common-mode interference, wherein the second termination system includes third impedance implemented between the first component and a non-component-based ground or an Earth-based ground and fourth impedance implemented between the second component and the non-component-based ground or the Earth-based ground.

7. The apparatus of claim 6, wherein:
the first impedance is a first resistor;
the second impedance is a second resistor;
the third impedance is a third resistor; and
the fourth impedance is a fourth resistor.

8. The apparatus of claim 6, wherein:
at least one of the first component or the second component including a printed circuit board (PCB);
the first ground loop of the communication system corresponding to a PCB-based ground within at least one of the first component or the second component; and
the second ground loop of the communication system corresponding to a non-PCB-based ground or an Earth-based ground.

9. The apparatus of claim 6, wherein:
the first component being a first shielded or unshielded enclosed communication device; and
the second component being a second shielded or unshielded enclosed communication device.

10. The apparatus of claim 6 further comprising:
the second termination system configured to absorb or dissipate the common-mode interference, wherein the common-mode interference is coupled into the single-ended communication link.

11. The apparatus of claim 6 further comprising:
the second termination system configured to absorb or dissipate the common-mode interference.

12. The apparatus of claim 11, wherein:
the first impedance and the second impedance each having a first impedance value; and
the third impedance and the fourth impedance each having a second impedance value.

13. The apparatus of claim 6, wherein the communication system is at least one of a satellite communication system, a wireless communication system, a wired communication system, a fiber-optic communication system, or a mobile communication system.

14. A method for operating a communication system, the method comprising:
operating a first termination system to perform impedance matching for a first ground loop of the communication system associated with a signal transmitted between a first component and a second component within the communication system that includes a single-ended communication link between the first component and the second component, wherein the first termination system includes first impedance implemented in-line between the first component and first end of the single-ended communication link and second impedance implemented between second end of the single-ended communication link and a component-based ground within the second component; and
operating a second termination system to perform impedance matching for a second ground loop of the communication system associated with common-mode interference, wherein the second termination system includes third impedance implemented between the first component and a non-component-based ground or an Earth-based ground and fourth impedance implemented between the second component and the non-component-based ground or the Earth-based ground.

15. The method of claim 14, wherein:
the first impedance is a first resistor;
the second impedance is a second resistor;
the third impedance is a third resistor; and
the fourth impedance is a fourth resistor.

16. The method of claim 14, wherein:
at least one of the first component or the second component including a printed circuit board (PCB);
the first ground loop of the communication system corresponding to a PCB-based ground within at least one of the first component or the second component; and
the second ground loop of the communication system corresponding to a non-PCB-based ground or an Earth-based ground.

17. The method of claim 14, wherein:
the first component being a first shielded or unshielded enclosed communication device; and
the second component being a second shielded or unshielded enclosed communication device.

18. The method of claim 14 further comprising:
operating the second termination system to absorb or dissipate the common-mode interference.

19. The method of claim 14 further comprising:
operating the second termination system to absorb or dissipate the common-mode interference, wherein the common-mode interference is coupled into the single-ended communication link.

20. The method of claim 14, wherein the communication system is at least one of a satellite communication system, a wireless communication system, a wired communication system, a fiber-optic communication system, or a mobile communication system.

\* \* \* \* \*